United States Patent [19]

Gierke

[11] Patent Number: 4,985,893
[45] Date of Patent: Jan. 15, 1991

[54] CIRCUIT TESTING APPARATUS

[76] Inventor: Daniel Gierke, 1211 Brandywine Cir., Batavia, Ill. 60510

[21] Appl. No.: 318,554

[22] Filed: Mar. 3, 1989

[51] Int. Cl.$^5$ ............................................. G06F 11/00
[52] U.S. Cl. .................................................... 371/16.2
[58] Field of Search ..................... 371/16.2, 16.1, 22.6; 364/200 MS File, 900 MS File

[56] References Cited

U.S. PATENT DOCUMENTS

| | | | |
|---|---|---|---|
| 3,919,504 | 11/1975 | Crosley et al. | 371/22.6 |
| 3,930,146 | 12/1975 | Bogacz | 371/16.1 |
| 4,405,898 | 9/1983 | Flemming | 364/900 |
| 4,455,654 | 6/1984 | Bhaskar et al. | 371/16.2 |
| 4,547,845 | 10/1985 | Ross | 364/200 |
| 4,691,316 | 9/1987 | Phillips | 371/16.2 |
| 4,703,482 | 10/1987 | Auger et al. | 371/16.1 |
| 4,785,416 | 11/1988 | Stringer | 371/16.2 |

OTHER PUBLICATIONS

Falk, H. "Emulators Keep Space with Chip Speeds and Complexity" *Computer Design,* May 15, 1987, 31–38.

*Primary Examiner*—Jerry Smith
*Assistant Examiner*—Phung M. Chung
*Attorney, Agent, or Firm*—Douglas B. White

[57] ABSTRACT

Generally there is provided a ROM memory arranged to be inserted in place of a pre-existing ROM on the microprocessor based circuit board under test, wherein the ROM contains specific test sequences programmed therein. The test apparatus further includes a microprocessor control, a keypad, a display and an interface. On start up the circuit under test runs programs stored in the inserted ROM and outputs on the data bus information relative to the results. During some tests the circuit is held in a wait state to allow probing of the circuit under test for logic errors. In an operator programmed test mode the operator may cause the system to read and write data in response to entries from the keypad.

4 Claims, 4 Drawing Sheets

CIRCUIT TESTING APPARATUS

BACKGROUND OF THE INVENTION

1. Field of the Invention

This invention relates generally to testing equipment for microprocessor based circuitry. More particularly this invention relates to equipment for automatically testing and assisting in the manual testing of certain microprocessor based circuitry where the circuit under test includes a microprocessor, a read only memory (ROM), and a communication bus.

2. Description of the Prior Art

Previously, test equipment has separated into two principal types in plant equipment for use in manufacturing and field service equipment Previously proposed systems for in plant use involve removal of the microprocessor and replacement with a connector from a computerized test set. An example of this system is shown in U.S. Pat. No. 4,405,054 and U.S. Pat. No. 4,622,647. Field service has principally used switches and displays provided on a maintenance panel and, accordingly, this was limited to large computer systems. Computer controlled testing of an isolated microprocessor clip has been proposed for field service testing (U.S. Pat. No. 4,308,615). This system uses a microprocessor based control to execute instructions carried in its memory and thereby perform operations on the microprocessor chip under test.

SUMMARY OF THE INVENTION

It is therefore an object of the present invention to provide test apparatus which is practical for field service of a complete microprocessor based circuit (sometimes referred to as a mother board) including not only the microprocessor chip, but also including associated devices, I/0 devices, buffers and memories.

Generally there is provided a ROM memory arranged to be inserted in place of a pre-existing ROM on the microprocessor based circuit board under test, wherein this inserted ROM contains specific test sequences programmed therein. The test apparatus further includes a microprocessor control, a keypad, a display and an interface. On start up, the circuit under test runs programs stored in the inserted ROM and outputs on the data bus information relative to the results. These results are monitored by the control microprocessor and displayed. During some tests the circuit is held in a static state to allow probing of the circuit under test for errors on the communication bus while an operator may provide entries via the keypad.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

DESCRIPTION OF THE PREFERRED EMBODIMENT

Figure 1:
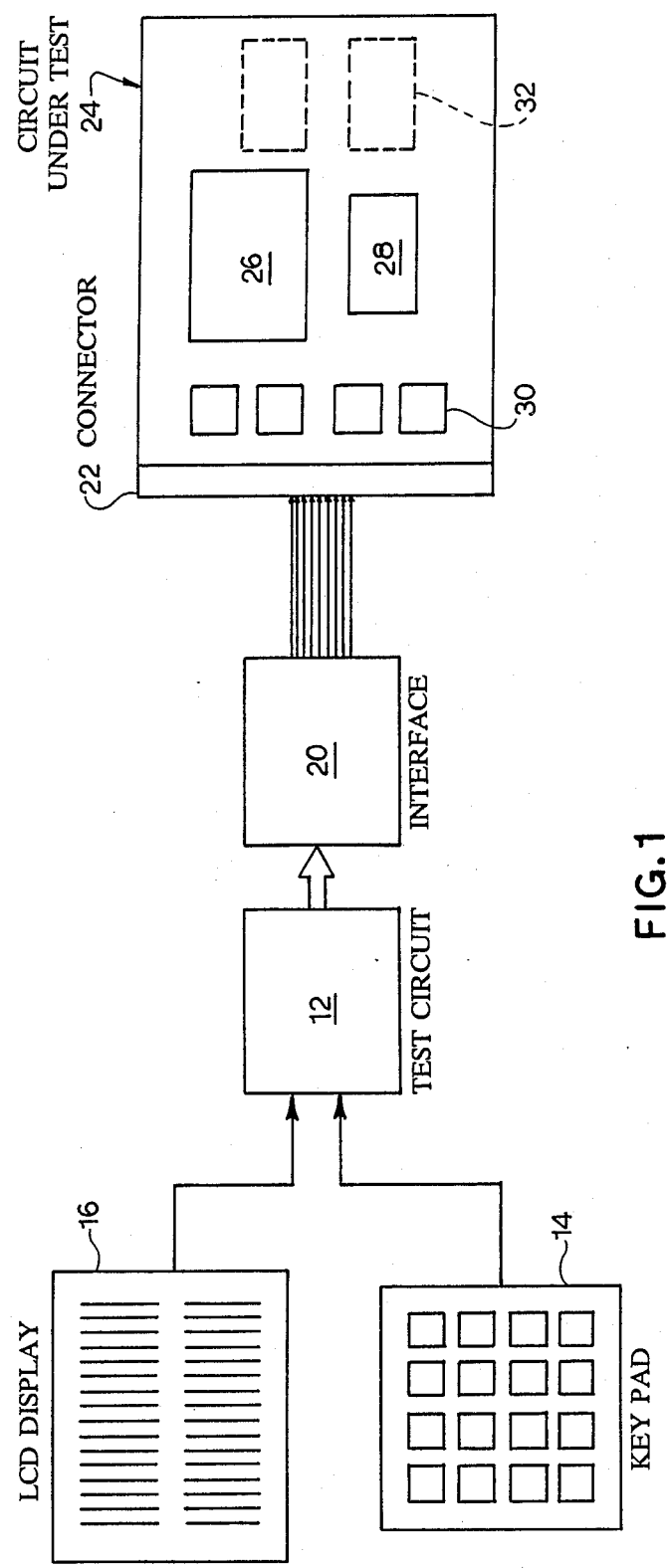
FIG. 1 is a block diagram of the testing system in accordance with the preferred embodiment.

The testing apparatus of the subject invention is depicted in a block form in FIG. 1. Particularly, the circuit is separated into two portions: the test circuit (shown as a block diagram in FIG. 2) and the interface circuit (shown as a block diagram in FIG. 3). These circuits, in combination with a programmed read only memory (ROM) inserted on the board of the circuit under test, function to exercise the microprocessor, the communication bus, and other associated operational components on the circuit under test.

Specifically, the test circuit 12 is electrically connected to a sixteen key hexadecimal keypad 14 and a sixteen character two-line LCD display 16. This test control circuit includes a customary microprocessor circuit including ROM and RAM memory and customary input/output circuitry arranged to operate in a manner well known in the art. The interface circuit 20 is electrically connected to the test control circuit board 12 and, via a connector attachment 22, is connected to the circuit being tested 24 The circuit under test is a microprocessor circuit board, typically of the type commonly used in computers known as PC's which include a microprocessor 26, a ROM memory 28 and, in some cases, other associated circuit elements 30, such as buffers, latches, parallel to serial converters or logic devices. Such a unit may also have additional memory, input/output devices, and in some cases unused positions 32 on the circuit board for additional ROM chips.

Figure 2:
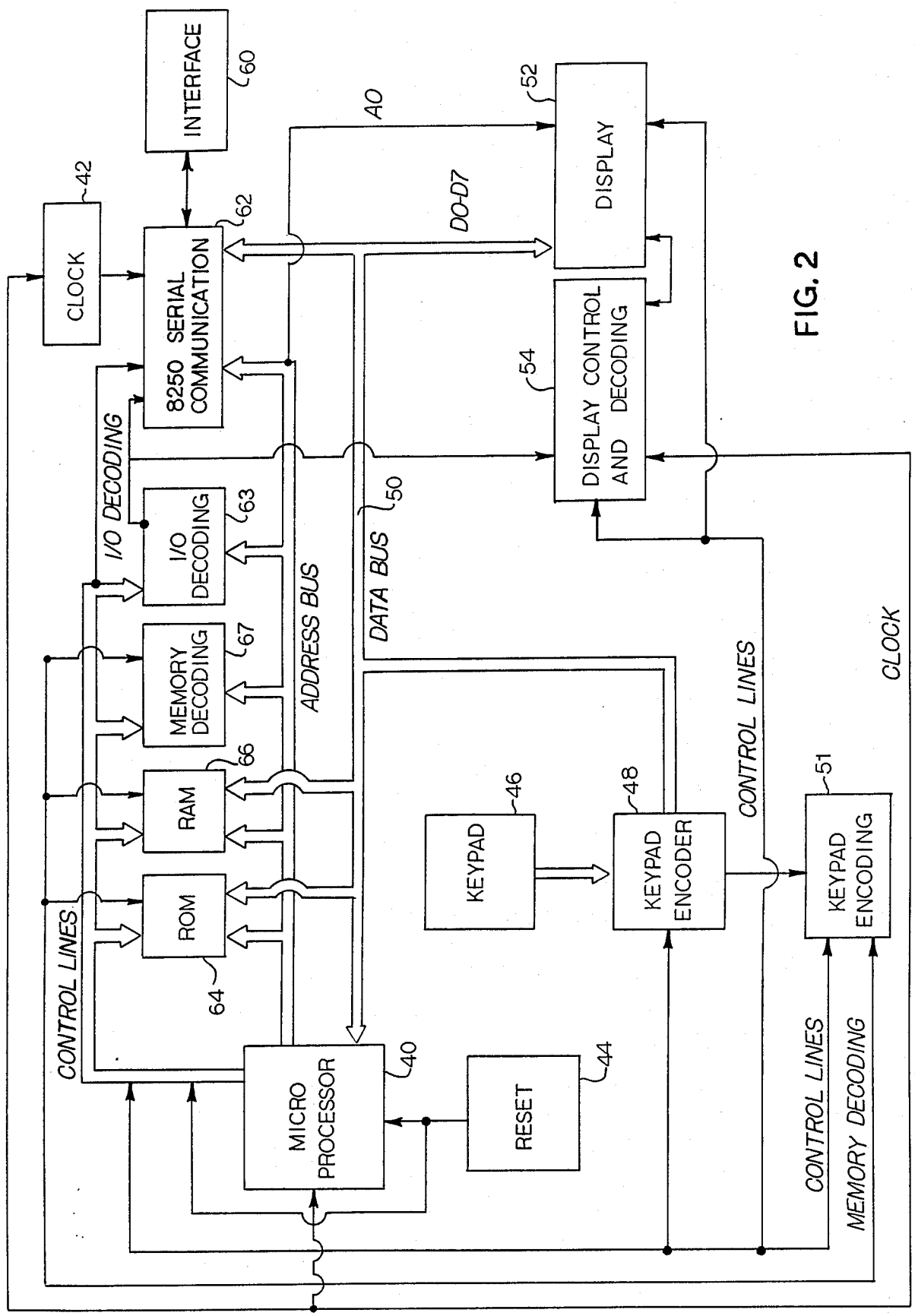
FIG. 2 is a block diagram of the circuitry of the test board controller of the present invention.

Turning now to the circuitry of the test control board shown as a block diagram in FIG. 2. The test board includes a microprocessor chip 40 of a type commonly in use in the industry. (In the preferred embodiment a Z80 model manufactured by Zilog is employed ) This microprocessor is coupled to a system clock 42 and reset logic 44. The reset logic functions to initiate and re-initiate the operation of the test control microprocessor.

Operator input to the test control microprocessor, during appropriate tests, is provided through a four-by-four, sixteen character hexadecimal keypad 46. The keypad is read through decoder 51 and signals from the keypad are fed through an encoder 48 to a bus 50 under control of a decoder 51. The bus serves, in this instance, as inputs to the microprocessor.

Display of output from this control microprocessor typically provides circuit malfunction information, in terms of (1) whether the circuit passed or failed a particular test, (2) what bit pattern was on the bus during certain tests, (3) what chips failed, or (4) other diagnostic information. The display device 52 is a sixteen character, two-line, LCD display, and information is directed to the display via bus 50 by a decoder and display control 54.

The control microprocessor communicates with the interface circuit through the interface connector 60 carrying bit information from the 8250 (parallel to serial) communication device 62 and the I/O decoder 63. Through this communcation device, information is sent to the interface and received by the control microprocessor from the interface. Also operatively connected with the control microprocessor, in a manner well known in the art, are ROM 64 and RAM 66 memories, and memory decoder 67. The ROM is programmed for operation of the control microprocessor functions including the keypad and display, and also including diagnostic information; while the RAM is used for temporary storage of information. It is important to note that this ROM maintains operational programming and not specific test instructions for exercising the circuit under test.

Figure 3:
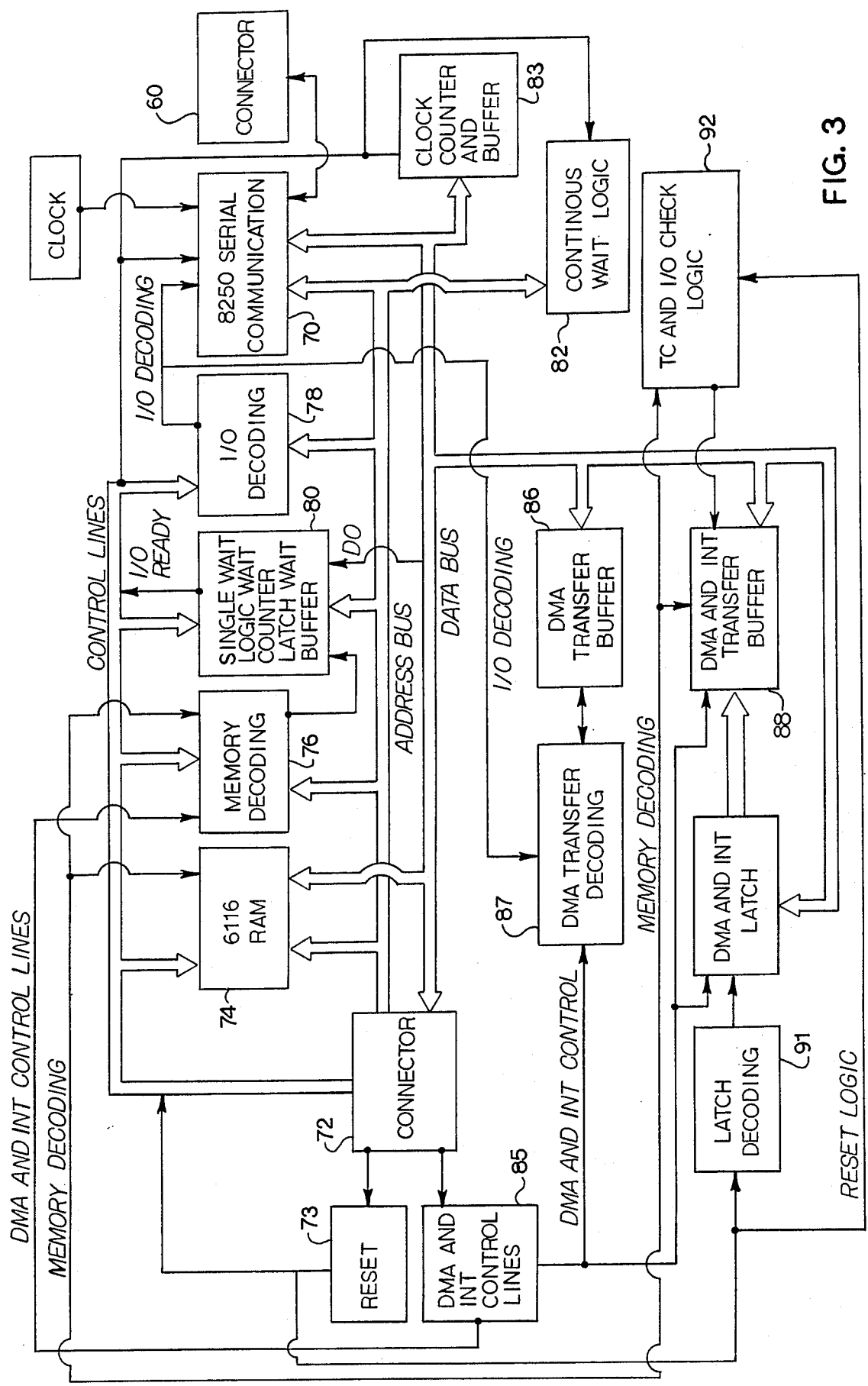
FIG. 3 is a block diagram of the interface circuit of the present invention which interconnects between the test board controller and the circuit under test.

The interface circuit, shown in block form in FIG. 3, consists principally of typical microprocessor associated components including memory, buffers, and a communication device. But additionally, there is provided a circuit for controlling the wait state condition involved in the memory read operation, and this circuit is described in detail below. This interface circuit may physically be located on the test board or it may be connected to the test board circuit through the interface connector 60 via a 8250 (parallel to serial) communication device 70. Similarly, the interface connects to the circuit under test through a bus connector 72 having address bus, data bus, and reset logic 73 connected thereto In the interface there is connected to address lines of the bus a RAM memory 74, a memory decoder 76, an I/O decoder 78, and these are employed in a manner well known in the art. Also connected to the bus is the wait state circuitry 80 and 82. Located on the data lines and connected to control lines 85 is a direct memory access (DMA) transfer buffer 86 and decoder 87, DMA and interrupt transfer buffer 88, associated latch 90 and latch decoder 91.

Figure 4:
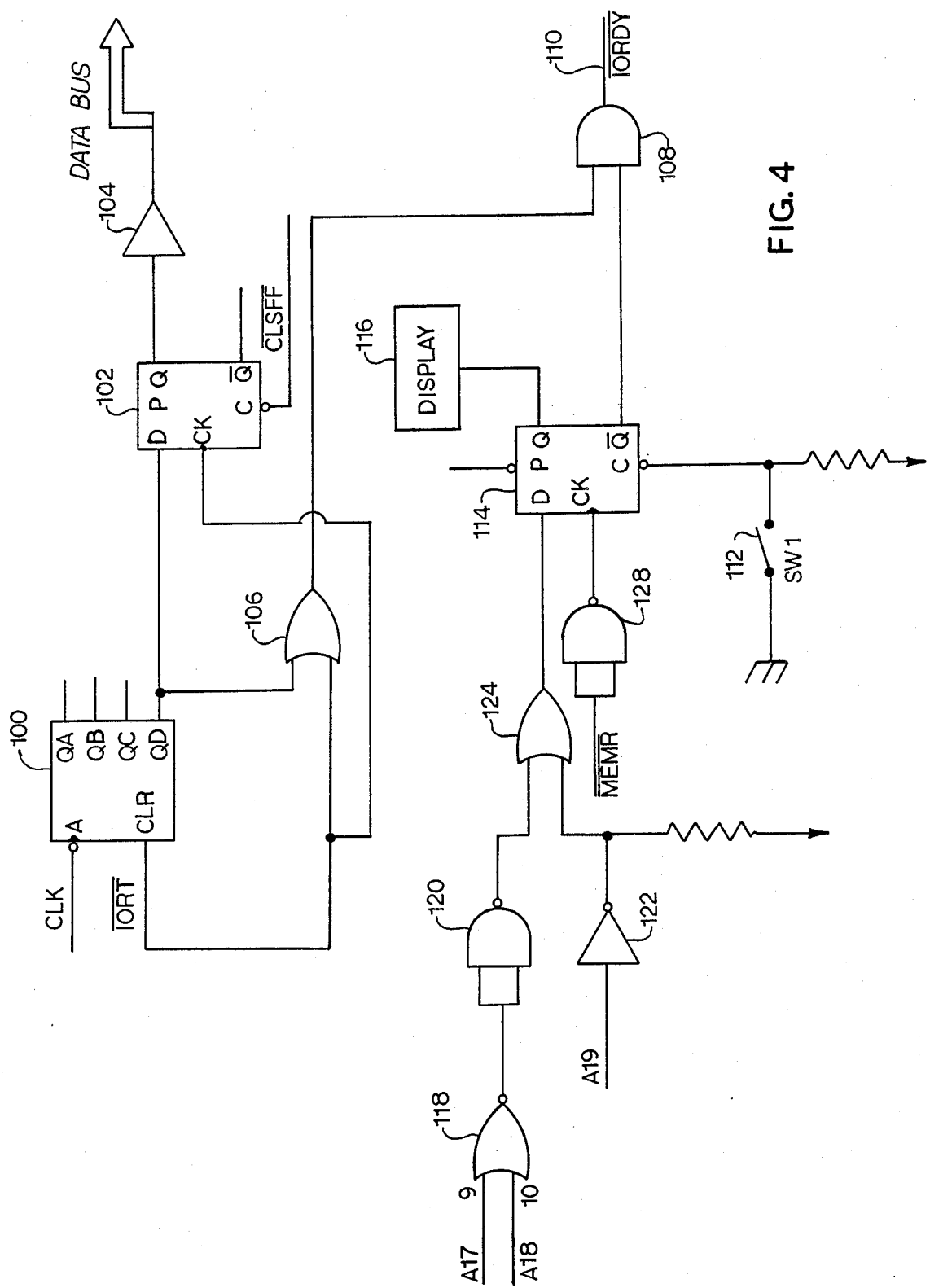
FIG. 4 is a schematic of a portion of the circuitry on the interface circuit for testing and controlling the memory read wait state.

The wait state logic, shown in schematic form in FIG. 4 is used to test and to control what is known as the wait state condition involved during a memory read cycle of the circuit under test. The wait state is a period of time when the read control line of the circuit under test remains low during a "memory read" operation and is typically controlled by a pin on the microprocessor of the circuit under test and referred to as the ready pin. The signal to that pin is referred to as the "Ready" signal. In this feature of the circuitry of the present invention, the wait state is tested and the "Ready" signal is made subject to manual control. Under manual control an operator is allowed to freeze an address on the bus and verify the operation of bus and the associated circuitry.

Particularly, in the wait state testing circuitry a counter 100 is provided with a clock signal at one input and a memory read signal on its "clear" input. This memory read is generated through a ROM instruction writing to a decoder and is brought low when the memory read is initiated. The resulting counter output is high after an eight count cycle of system clock pulses if the computer wait state remains low during that period. Normally the wait state is four cycles, after which the memory read signal goes high In this circuit the control generated read signal (IORT) is fed through logic to the ready pin of the microprocessor to extend the wait state. If the wait state is working properly the counter will complete its cycle and, since it is also fed to the ready pin, it will switch the "Ready" signal and terminate the sequence. In this case a "1" is clocked to the flip-flop and output on the bus to indicate a pass of the test. If the wait state is not working, the counter is cleared early and a "0" is clocked into the flip-flop 102; and the output to the bus is likewise also "0" to indicate a failure.

Control of the wait state is provided by feeding the memory read signal through OR gate logic 106 with the counter output and thereafter to the input of AND gate 108 to control the wait state "Ready" signal on line 110. As a result the signal to the microprocessor ready pin will maintain the circuit under test in the wait state until the counter cycle is complete, if the wait state is working.

The "Ready" signal is also arranged to respond to a manual switch 112 positioned to operate the "clear" of flip-flop 114. The object of the manual control is to hold the circuitry in a suspended wait state while an operator probes for correct logic states in the bus circuitry. When the switch is closed, the flip-flop 114 is maintained cleared and the signal to AND gate 108 is high. As a result the signal on line 110 responds directly with the output of the OR gate 106 and system operation remains unaffected by the switch (test mode). When the switch is opened, however, and when correct address information appears on address lines A17, A18 and A19; then when the system generated memory read signal (MEMR) goes low, the flip-flop 114 outputs a "0" to gate 108 and causes the signal on line 110 to stay low until the switch is released Consequently, the ready pin input to the microprocessor is held low to extend the wait state. During this time the complementary output of the flop-flop 114 is directed to a display device 116, such as a LED, to indicate the wait state.

To operate the Circuit Testing Apparatus, the test board, interface, and circuit under test are connected as shown in FIG. 1. The programmed ROM is inserted in place of the existing ROM 28 on the circuit under test, and power is applied to the circuit under test. The microprocessor of the circuit under test, in response to traditional inherent operational programming, automatically begins to execute programs stored in the inserted ROM beginning with an initial starting address specific to the device under test. But since the pre-existing ROM has been replaced, the instructions being executed are now test programs instead of system start-up instructions. The first of such automatically executed programs tests the microprocessor chip itself.

Testing of the microprocessor chip involves first disabling the interrupts, then setting the numerous flags to a first state. The flags are read, then reset to the other state and re-read. When read, the flags are tested for correct values and a failure (a bad chip) is indicated in the contol board display.

After testing the microprocessor chip the system proceeds to test the other circuitry such as the parity check circuitry, timer, Direct Memory Transfer (DMA), interrupt controller, non-maskable interrupt (NMI), input/output devices, I/O ready line (wait state), RAM memory, ROM memory, manual switch settings, speaker, and test of the communication bus under operator controlled program mode.

After testing the microprocessor chip, before proceeding further, if the microprocessor chip is good, the system tests the RAM memory on the interface card since it will be used for subsequent tests This is done by writing to and reading from all address locations in the RAM. Following the RAM test the interrupt controller and the communication device (typically an 8255) of the circuit under test are programmed. At this point the remaining tests can be performed; and the series of tests can be strung together and sequentially executed automatically, or they can be initiated individually in response to a keypad entry by having each test routine return to a main program which responds to the keypad entries.

Of the series of test routines, test of the speaker function involves enabling the programmable timer of the circuit under test, setting the frequency, and then addressing the 8255 to enable the speaker. Next the frequency is changed and operation is re-checked.

Test of the switch settings involve setting the manual switches (indicating memory, disk drives, etc.) and then reading the switches through the programmed instructions.

Test of the inserted ROM requires a customary test of the check-sum; and test of the RAM of the circuit under test, involves reading from and writing to all locations. Testing of the 8255 of the circuit under test is accomplished by reading from and writing to all ports.

Test of the I/O "Ready" signals involves use of the wait state logic. First, the circuit under test is caused to write a "0" to IORT to set the wait state, causing signal IORDY (line 110, FIG. 4) to remain low and extend the wait state until either IORT signal goes high at the end of the wait state or the eight count extension is completed. At the end of the wait state the output to the data bus will be high if the wait state occurred for eight cycles but low if the wait state was not.

Test of the I/0 parity check flip-flop involves clearing the device, setting the flip-flop, testing to see if it is set, and repeating the sequence sufficiently to verify its operation. Similarly, the NMI (non-maskable interrupt) is repeately set, tested and reset.

Test of the interrupt controller is accomplished by clearing, setting and testing its operation. Testing of the timer involves setting an interrupt to occur at a specific time interval, waiting and looking for the interrupt. Test of the DMA (direct memory access) is accomplished by setting the appropriate registers, calling for the DMA transfer, and checking to see if it occurred.

Testing of the parity check operation is accomplished by first writing to the RAM and repeating the write operation many times. Then, the data is read many times and a parity check signal is looked for. If it doesn't appear after all of these operations, the system assumes a failure of the parity check circuit has occured.

In the operator controlled program mode of operation, characters are entered from the keyboard, analyzed by the control microprocessor for address, data, or port information. Information is then output to specific ports, input from ports, and analyzed for error. During this operation, the manually operable wait state may be initiated to freeze the status of the communication bus for operator probing.

From the foregoing description, it will be apparent that modifications can be made to the apparatus and method for using same without departing from the teaching of the present invention. Accordingly the scope of the invention is only to be limited as necessitated by the accompanying claims.

I claim:

1. An electronic testing apparatus for testing a microprocessor based circuit, said circuit under test including a microprocessor, a ROM memory and a communication bus, the test apparatus comprising:

a control unit including a microprocessor, a display, memory means, and a communication bus, wherein said control unit is arranged to receive diagnostic test results and display information responsive thereto;

an interface unit coupled to the communication bus of said control unit and to said communication bus of said circuit under test, said interface unit being arranged to respond to said control unit and to said circuit under test and to transmit data therebetween;

an insertable ROM memory arranged to be inserted into the circuit under test in place of the pre-existing ROM memory, said insertable ROM memory being programmed with instructions operable by the microprocessor of the circuit under test for testing the circuit under test and providing data output indicating the results of the test; and wait state test circuitry including a counter responsive to a memory read instruction, circuit means for generating a "Ready" signal to the microprocessor of the circuit under test in response to the memory read instruction and to the state of said counter, such that the "Ready" signal holds the wait state for extended duration if the wait state is operational.

2. The electronic testing apparatus of claim 1 further comprising means for monitoring the output of the counter to indicate faulty early termination of the wait state.

3. An electronic testing apparatus for testing a microprocessor based circuit, said circuit under test including a microprocessor, a ROM memory and a communication bus, the testing apparatus comprising:

a control unit including a microprocessor, a display, memory means, and a communication bus, wherein said control unit is arranged to receive diagnostic test results and display information responsive thereto;

an interface unit coupled to the communication bus of said control unit and to said communication bus of said circuit under test, said interface unit being arranged to respond to said control unit and to said circuit under test and to transmit data therebetween;

an insertable ROM memory arranged to be inserted into the circuit under test in place of the pre-existing ROM memory, said insertable ROM memory being programmed with instructions operable by the microprocessor of the circuit under test for testing the circuit under test and providing data output indicating the results of the test; and input means in said control unit and further comprising program means in said insertable ROM for causing the microprocessor in the circuit under test to:

(a) read from said input means;

(b) read and write data to selected ports in response to said input;

(c) verify the data following said read and write operations;

(d) transmit to said display means the results of said verification.

4. The electronic testing apparatus of claim 3 further comprising means to manually switch the circuit under test to maintain a wait state during a memory read operation and thereby hold address bits on the communication bus.

* * * * *